US009195345B2

(12) United States Patent
Tumanov (10) Patent No.: US 9,195,345 B2
(45) Date of Patent: Nov. 24, 2015

(54) POSITION AWARE GESTURES WITH VISUAL FEEDBACK AS INPUT METHOD

(75) Inventor: Ilya Tumanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 761 days.

(21) Appl. No.: 12/914,994

(22) Filed: Oct. 28, 2010

(65) Prior Publication Data
US 2012/0110516 A1    May 3, 2012

(51) Int. Cl.
| H04W 4/20 | (2009.01) |
| G06F 3/042 | (2006.01) |
| G06K 9/00 | (2006.01) |
| G06F 3/01 | (2006.01) |
| G06F 3/0346 | (2013.01) |

(52) U.S. Cl.
CPC .............. *G06F 3/0425* (2013.01); *G06F 3/017* (2013.01); *G06F 3/0346* (2013.01); *G06K 9/00335* (2013.01); *H04W 4/206* (2013.01)

(58) Field of Classification Search
CPC ............ G06F 3/0425; G06K 9/00335; G06K 9/00355
USPC ................... 715/863, 754, 856; 382/103, 107
See application file for complete search history.

(56) References Cited

U.S. PATENT DOCUMENTS

| 5,594,469 | A | * | 1/1997 | Freeman et al. ............... 345/158 |
| 5,751,843 | A | * | 5/1998 | Maggioni et al. .............. 382/154 |
| 6,128,003 | A | * | 10/2000 | Smith et al. ................... 345/157 |
| 6,191,773 | B1 | * | 2/2001 | Maruno et al. ................ 345/158 |
| 6,204,852 | B1 | * | 3/2001 | Kumar et al. .................. 345/419 |
| 6,256,033 | B1 | * | 7/2001 | Nguyen ......................... 715/863 |
| 6,624,833 | B1 | * | 9/2003 | Kumar et al. .................. 715/863 |
| 6,658,136 | B1 | * | 12/2003 | Brumitt ......................... 382/103 |
| 6,943,774 | B2 | * | 9/2005 | Horiki ............................ 345/158 |
| 7,000,200 | B1 | * | 2/2006 | Martins ......................... 715/863 |
| 7,095,401 | B2 | * | 8/2006 | Liu et al. ....................... 345/156 |

(Continued)

FOREIGN PATENT DOCUMENTS

| CN | 1666248 A | 9/2005 |
| WO | 2004003656 A2 | 1/2004 |

OTHER PUBLICATIONS

Zhu, Youding. "Model-Based Human Pose Estimation with Spatio-Temporal Inferencing", Retreived at << http://etd.ohiolink.edu/send-pdf.cgi/Zhuc%20Youding.pdf?acc_num=osu1242752509 >>, 2009, pp. 174.

(Continued)

*Primary Examiner* — Nicholas Ulrich
(74) *Attorney, Agent, or Firm* — Jessica Meyers; Jim Ross; Micky Minhas (57) ABSTRACT

A gesture based user interface is provided for a user to interact with a device in order to operate and control the device through detection of gestures and movements of the user. Visual feedback of the user gestures is provided to the user to aid in the user's operational and control decisions of a device. An image capturing device such as a video camera may be employed to capture a user's image, and an integrated application on a computing device may process continuous images from the capturing device to recognize and track user gestures. The gestures may correlate to an object and/or location on the display and the user's image may be projected on the display to provide visual feedback of the user's interaction.

20 Claims, 7 Drawing Sheets

(56) References Cited

U.S. PATENT DOCUMENTS

| | | | |
|---|---|---|---|
| 7,133,537 B1* | 11/2006 | Reid | 382/103 |
| 7,225,414 B1* | 5/2007 | Sharma et al. | 715/863 |
| 7,227,526 B2* | 6/2007 | Hildreth et al. | 345/156 |
| 7,259,747 B2* | 8/2007 | Bell | 345/156 |
| 7,340,077 B2* | 3/2008 | Gokturk et al. | 382/103 |
| 7,367,887 B2 | 5/2008 | Watabe et al. | |
| 7,421,093 B2* | 9/2008 | Hildreth et al. | 382/103 |
| 7,620,900 B2* | 11/2009 | Kawashima et al. | 715/754 |
| 7,665,041 B2 | 2/2010 | Wilson et al. | |
| 7,840,031 B2* | 11/2010 | Albertson et al. | 382/103 |
| 8,140,970 B2* | 3/2012 | Brown et al. | 715/709 |
| 8,199,106 B2* | 6/2012 | Sugaya et al. | 345/157 |
| 8,270,670 B2* | 9/2012 | Chen et al. | 382/103 |
| 8,378,970 B2* | 2/2013 | Nishida et al. | 345/158 |
| 2002/0006222 A1 | 1/2002 | Inagaki et al. | |
| 2005/0271279 A1* | 12/2005 | Fujimura et al. | 382/203 |
| 2006/0010400 A1* | 1/2006 | Dehlin et al. | 715/856 |
| 2006/0150104 A1* | 7/2006 | Lira | 715/733 |
| 2008/0181459 A1* | 7/2008 | Martin et al. | 382/103 |
| 2008/0189661 A1* | 8/2008 | Gundlach et al. | 715/863 |
| 2009/0102800 A1 | 4/2009 | Keenan | |
| 2009/0183125 A1* | 7/2009 | Magal et al. | 715/863 |
| 2010/0034457 A1* | 2/2010 | Berliner et al. | 382/154 |
| 2010/0050133 A1* | 2/2010 | Nishihara et al. | 715/863 |
| 2010/0079413 A1* | 4/2010 | Kawashima et al. | 345/175 |
| 2010/0159981 A1* | 6/2010 | Chiang et al. | 455/556.1 |
| 2010/0177035 A1* | 7/2010 | Schowengerdt et al. | 345/156 |
| 2010/0199228 A1 | 8/2010 | Latta et al. | |
| 2010/0329511 A1* | 12/2010 | Yoon et al. | 382/103 |
| 2011/0296353 A1* | 12/2011 | Ahmed et al. | 715/848 |
| 2012/0194561 A1* | 8/2012 | Grossinger et al. | 345/661 |

OTHER PUBLICATIONS

Lin, et al., "Hand tracking using spatial gesture modeling and visual feedback for a virtual DJ system", Retrieved at << http://ieeexplore.ieee.org/stamp/stamp.jsp?tp=&arnumber=1166992 >>, International Conference on Multimodal Interfaces, Proceedings of the 4th IEEE International Conference on Multimodal Interfaces, Oct. 14-16, 2002, pp. 6.

Donnell, et al., "PlayStation Move: The Next Step for Gesture-Based Gaming?", Retrieved at << http://www.extremetech.com/article2/0,2845,2361647,00.asp >>, Mar. 23, 2010, pp. 5.

"Third Office Action issued for Chinese Patent Application No. 201110355935.8", Mailed Date: Feb. 28, 2015, 6 Pages.

"Office Action and Search Report Issued in Chinese Patent Application No. 201110355935.8", Mailed Date: Jan. 6, 2014, 14 Pages.

"Office Action Issued in Chinese Patent Application No. 201110355935.8", Mailed Date: Aug. 27, 2014, 7 Pages.

* cited by examiner

POSITION AWARE GESTURES WITH VISUAL FEEDBACK AS INPUT METHOD

BACKGROUND

Traditional media equipment and computer controlled devices such as computers, televisions, message boards, electronic billboards, and monitoring devices are controlled directly over a user interface using input hardware. Typically, they are directly controlled using input devices such as a mouse, remote control, keyboard, stylus, touch screen, or the like for controlling the device. Since the input devices are integrated with the devices, in order for users to interact with a device, the users must have direct access to or be in close proximity to such input devices and screens in order to initiate actions on, operate and control the devices through keystrokes on a keyboard, movements of a mouse, and selections on a touchscreen. If the input devices are not directly accessible to the users, the interaction between the user and the devices may be limited and the user may not be able to operate and control the devices, thus limiting the usefulness of the devices.

Some devices are equipped with motion detection mechanisms and can be activated, for example, by the waving of a hand or detection of motion in a predefined area. Such mechanisms are typically coarse, however, and are incapable of providing detailed control. Touch-based technologies provide control capabilities similar to those of hardware input device like mice or keyboards, but those technologies require physical interaction with a surface, commonly the display surface of the device.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a user interface, where a user may interact with a device to operate and control the device through detection of gestures and movements of the user. According to some embodiments, visual feedback of the user gestures may be provided to the user to aid in the user's operational and control decisions of a device. An image capturing device such as a video camera may be employed to capture a user's image, and an integrated application on a computing device may process continuous images from the capturing device to recognize and track user gestures. The gestures may correlate to an object and/or location on the display and the user's image may be projected on the display to provide visual feedback of the user's interaction.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, user gestures may be recognized and tracked over an interactive user interface in order to provide input to and initiate an action supported by a computer application. In addition, visual user feedback may be provided to a user by generating a semi-transparent image on a specific location on a display over the user interface, allowing the user to observe and control gesture inputs visually with minimal interference to the user interface.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for tracking user gestures over an interactive user interface and projecting an image of the user over the user interface on a display to provide visual feedback on the location where user interaction occurs. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
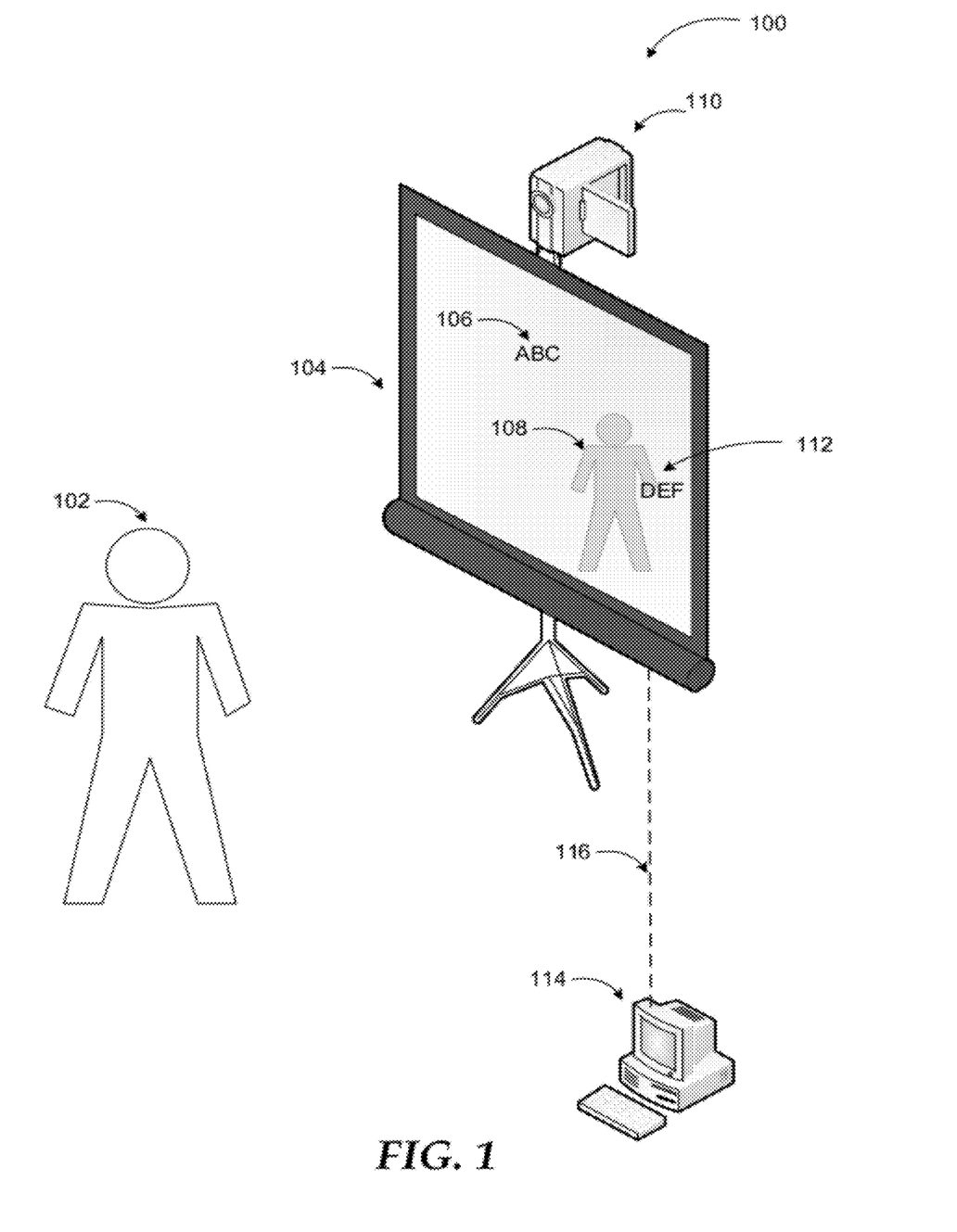
FIG. 1 illustrates a computer system with position aware gesture input and user interaction, where embodiments may be implemented.

Referring to FIG. 1, diagram 100 illustrates a computer system with position aware gesture input and user interaction, where embodiments may be implemented. The computing device and user interface environment shown in diagram 100 are for illustration purposes. Embodiments may be implemented in various local, networked, and similar computing environments employing a variety of computing devices and systems.

FIG. 1 illustrates an example embodiment of a configuration of a gesture recognition and visual feedback system 100, where a user 102 may operate and control an application on a computing device 114 by performing one or more gestures or movements. In an example embodiment, the gesture recognition and visual feedback system 100 may be used to detect, analyze and track gestures of a user 102, and to provide visual feedback 108 of the user's gestures to the user 102 on display 104.

An interactive user interface is presented on display 104 for position aware gesture based control of an application executed on computing device 114. In the interactive control, user 102 is not in direct contact or close proximity to the system which precludes using contact input devices such as touch screens. The system comprises computing device 114 coupled to (116) display 104 and camera 110 for capturing images of user 102 in order to detect the user's gestures.

In a system according to embodiments, user 102 does not need to use any input equipment such as pointing devices (e.g. mouse or keyboards) or passive or active markers used by existing input systems with cameras (e.g. light sources or high contrast markers) unlike traditional input models. The user's image is captured by a camera 110 for the purpose of registering input from the user thus giving user 102 the opportunity to interact with the application executed on computing device 114. Video stream from the camera 110 may then be processed in real time with two main purposes.

First purpose is to track and recognize gestures, which user 102 performs to provide input initiating different actions supported by the software executed on the computing device 114. Gesture can be performed by various body parts such as hands and constitute specific motion and/or positioning. Other parts of the body such as eyes performing blinking or motion of the body in its entirety may be used for input purposes as well, for example, to facilitate input from physically impaired users. Second purpose is to provide user with real time visual feedback by projecting the user's image 108 over the application's user interface. This image may be processed to minimize interference with the user interface and allow user 102 to observe user interface regardless of the user's position or motion.

As user 102 observes his/her own image on display 104, it is easy for the user to match location in the user's physical world with virtual location on the display. For example, as the user's hand is performing a gesture, the user can see it positioned in the vicinity of user interface component 112 (text "DEF") and not near component 106 (text "ABC"). Thus, user 102 can easily direct input to certain element or area on the display without a need for any kind of calibration or artificial trackers like a cursor. Physical contact (e.g., as with touch screens) is also not required. Due to humans cognitive ability to recognize and track themselves on the screen the system also allows for input to be performed by multiple users at the same time or by multiple body parts like both hands.

According to an example scenario, images from the camera may be captured and stored in memory. The difference between current frame and previous frame may be calculated resulting in binary output with either changed or unchanged pixels on the frame. Changed areas correspond to user's motion. For the purpose of tracking and recognizing gestures, the image may be divided into tiles of a predefined size(s) enabling location of changed areas by counting changed pixels within a specific tile. Neighboring areas that are considered changed may be combined together to produce a list of changed objects including size, position, and shape in the camera's coordinate system representing the user's motion. These objects may then be matched to objects detected on the previous frames based on size and location proximity. Next, the objects trajectories may be calculated in form of sets of coordinates changing in time. Finally, gestures may be detected by comparing trajectories with preset patterns and location of the gesture in camera's coordinates may be computed.

For the purpose of providing visual feedback to the user a binary picture may be transformed into a semi-transparent image, scaled, and adjusted to match the display (or as needed for particular case, such as bigger than the screen to allow for input on the edges). The image may be overlaid on top of user interface. As this image is semi-transparent and binary, it does not occlude user interface and allows user 102 to see the user interface. Because the image only contains differences between frames, motionless parts are not visible further reducing interference from the overlaid image. In the absence of user's motion (for example, the user is almost still watching TV) no interference would occur. In other embodiments, visual feedback image may be fully suppressed until predefined gesture is performed to avoid interference completely. It may be automatically suppressed again in a certain time after user input is completed.

Because scaling properties of the image are known, it is possible to match screen coordinates with the camera's coordinates which, in turn, may be matched by the user with the location on the screen closing the loop of visual feedback. Therefore, input gesture performed by the user in the real world may be matched to the screen coordinates and/or specific control. The input mechanism may be integrated into applications. Alternatively, for controlling of applications designed for traditional input methods, the operating system or an application handing the input may overlay visual feedback image using top level transparent window and map gestures on to existing input events.

In other example embodiments, gestures and movements by the user may be interpreted as controls and actions such as controls to position and move elements on a display, scroll through pages, and selection objects on a display. Furthermore, some movements may be interpreted as controls that may correspond to actions other than controlling the elements on a display. For example, the user may use varying gestures and movements such as predefined sign language gestures and gestures representing ASCII characters, to input information such as text, to change display information and preferences, to communicate, etc.

In further environments, a user interface may allow one or more users to communicate with a computing device and the computing device may track the gestures of multiple users and project visual feedback of each user concurrently. The projected visual feedback may identify which user's gestures it correlates to on the display, or in other embodiments, each user may identify their intended gestures based on user cognitive ability to recognize and track his or her own gesture.

Figure 2:
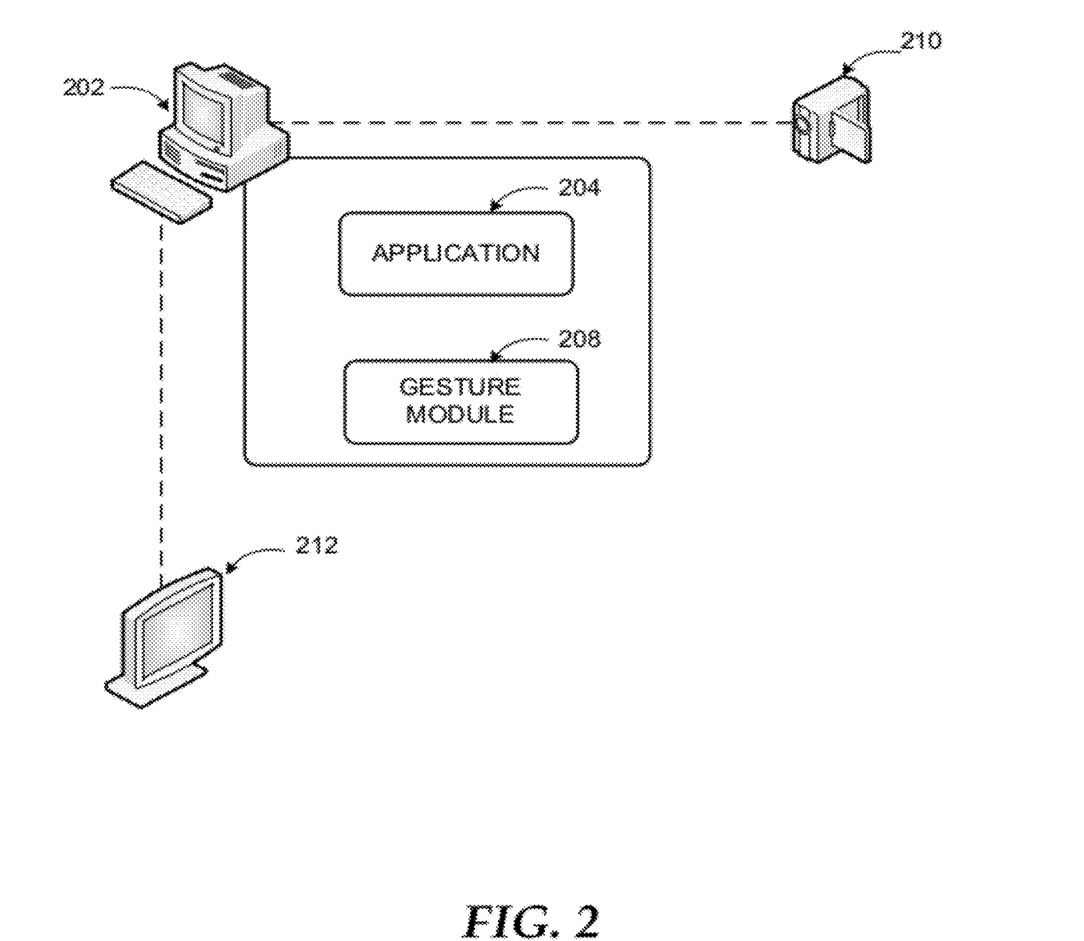
FIG. 2 illustrates an example of a position aware gesture based user interface in a computing device environment.

FIG. 2 illustrates in diagram 200 an example of a position aware gesture based user interface in a computing device environment. Position aware gesture based user interface may be implemented in a computing device such as computer 202 at an operating system level as an input mechanism for some or all applications executed on the computing device. Alternatively, the input mechanism may be implemented at application level. Thus, some applications such as application 204 may include an integrated gesture module 208, which receives captured images of user gestures through image capture device 210, track and recognize the gestures interpreting them as input for the application.

Gesture module 208 may provide visual feedback to the user through display device 212 making the recognition and interpretation process a loop and enhancing user confidence. Gesture module 208 may be a separate module or an integrated module within application 204. Furthermore, application 204 may be locally installed and executed on computer 202 or a distributed application that is executed on a server and accessed through the computer 202 over one or more networks.

For applications that are not configured to process motions and gestures as input mechanisms, the gesture module 208 may be integrated into these applications such that the gesture module acts to simulate existing input methods for control of the application such as for example, a mouse click, a keyboard input, and similar actions.

Figure 3:
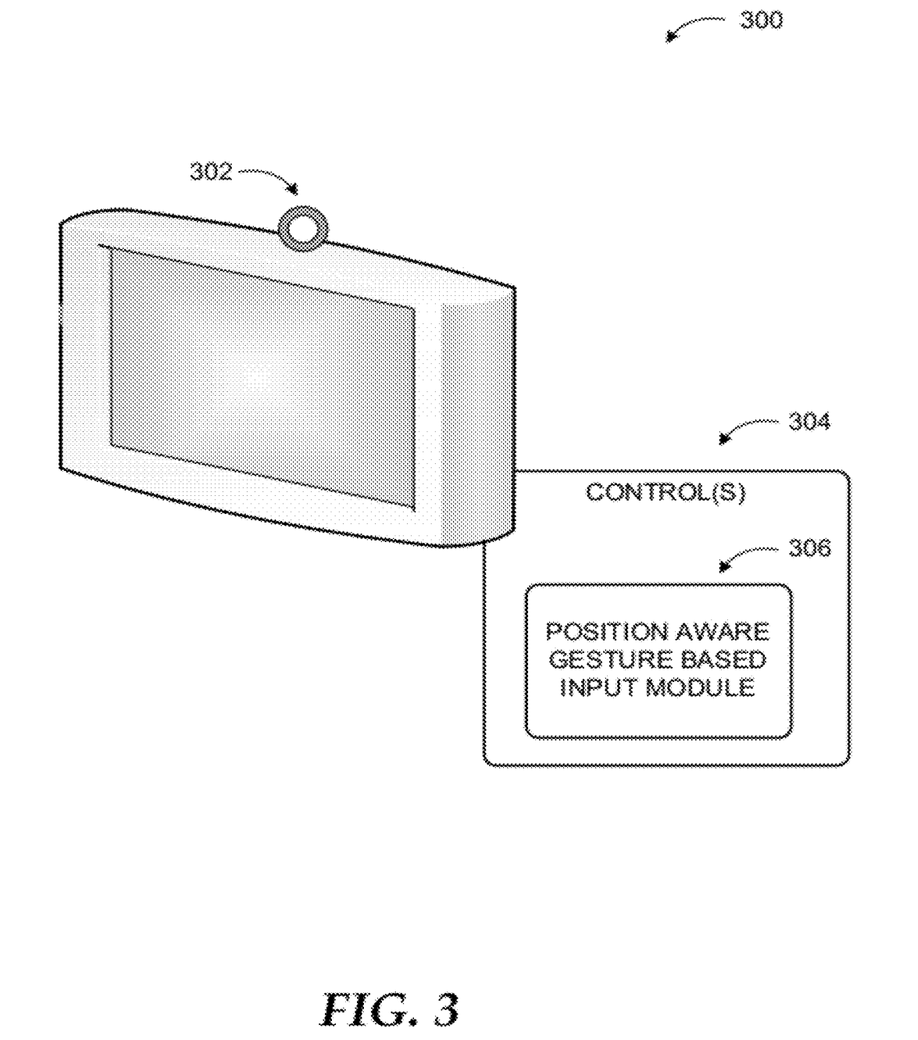
FIG. 3 illustrates an example of a position aware gesture based user interface in a television environment.

FIG. 3 illustrates an example of a position aware gesture based user interface in a television environment. Embodiments are not limited to position aware gesture based user interfaces in conventional computing devices. Modern technology enables many personal and other electronic devices to operate like computing devices with general purpose or special purpose processors executing instructions much like a computer. For example, a processor in an entertainment system enables user control of functions like sound controls, audio/video source selections, output controls, and so on. Many automated processes in daily life like automatic teller machines (ATMs) do not include a distinct computer inside, but one or more processors that perform tasks similar to a computer. Thus, any of these devices may be enabled to employ a position aware gesture based user interface.

Television set 300 is an example of use of a position aware gesture based input mechanism in a non-computer environment. Television set 300 may be equipped with an image capture device 302 (e.g. a camera). Various functions of the television set 300 may be controlled by a set of instructions executed by one or more processors (controls 304) within the television set 300. A subset of these instructions may include position aware gesture based input module 306, which may provide the input mechanism functionality described above. Position aware gesture based input module 306 may be an integral part of the electronic device's control instructions. Alternatively, the module may be a separate module, which may be uploaded or connected to the control mechanism of the device to operate in conjunction with the main controls of the device.

The example systems in FIG. 1 through 3 have been described with specific devices, applications, and interactions. Embodiments are not limited to systems according to these example configurations. A system for tracking gestures by a user, providing input to a computing device, and providing visual feedback to the user over an interactive user interface may be implemented in configurations employing fewer or additional components and performing other tasks. Furthermore, specific protocols and/or interfaces may be implemented in a similar manner using the principles described herein.

Figure 4:
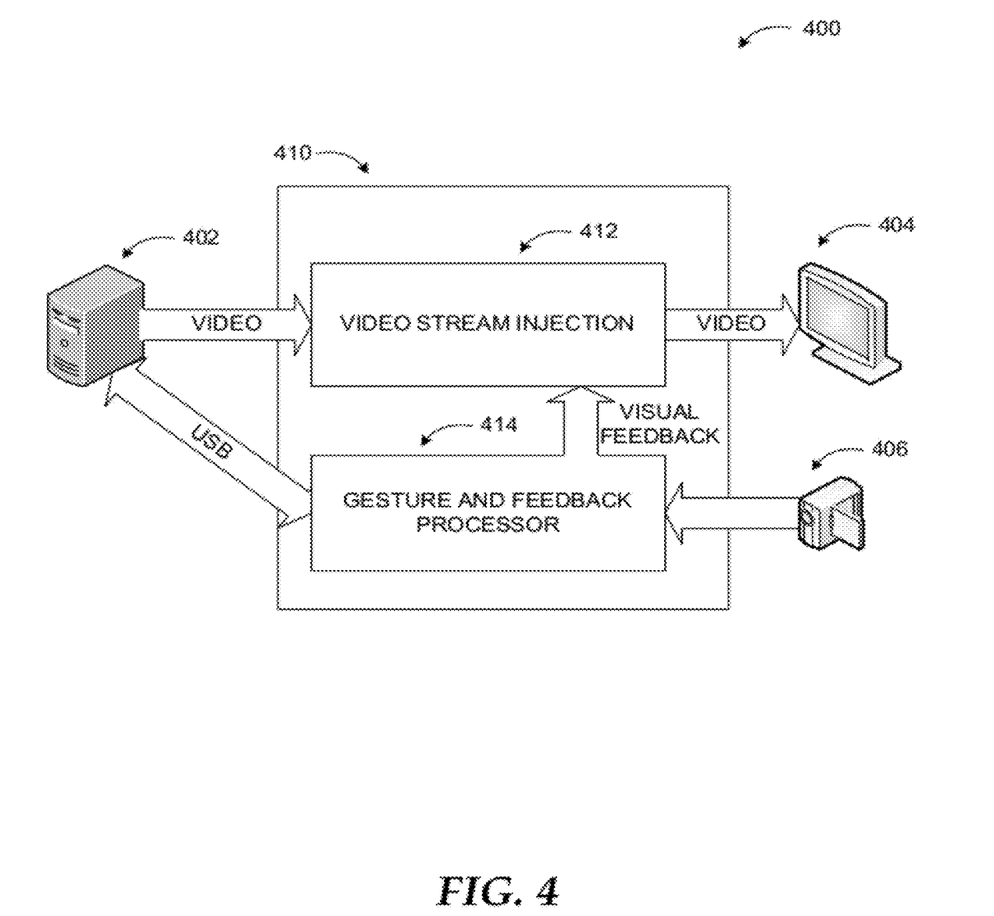
FIG. 4 illustrates an example stand-alone gesture controller implementation.

FIG. 4 illustrates an example stand-alone gesture controller implementation. According to some embodiments illustrated in diagram 400, a stand-alone gesture controller 410 may be implemented as a separate device which may be coupled between a computer 402 and a monitor 404 with additional connection(s) such as Universal Serial Bus (USB) or others, for control purposes. Connection to the video output of computer 402 allows for injection of the visual feedback (412) from a gesture and feedback processor 414 and also provides information about screen resolution such that the image from the camera 406 can be properly scaled and coordinates can be matched.

A connection like USB connection may simulate a standard Human Interface Device (HID) such as a mouse, thereby controlling computer 402 without any processing software executed on the computer itself. In addition, the USB interface may allow for optional configuration of the stand-alone gesture controller 410 from the computer 402, for example, for uploading of specific gestures to be recognized. Computer 402 may be any computing device (server, desktop, laptop, mobile, handheld, etc.) as long as it supports the interface to the controller and has a compatible video output.

Stand-alone gesture controller 410 may be implemented using an embedded microcontroller, potentially with a portion of its functionality offloaded to the hardware such as FPGA chip. That may enable the use of relatively low cost and/or low power components and may not create any additional load on the controlled computer.

Figure 5:
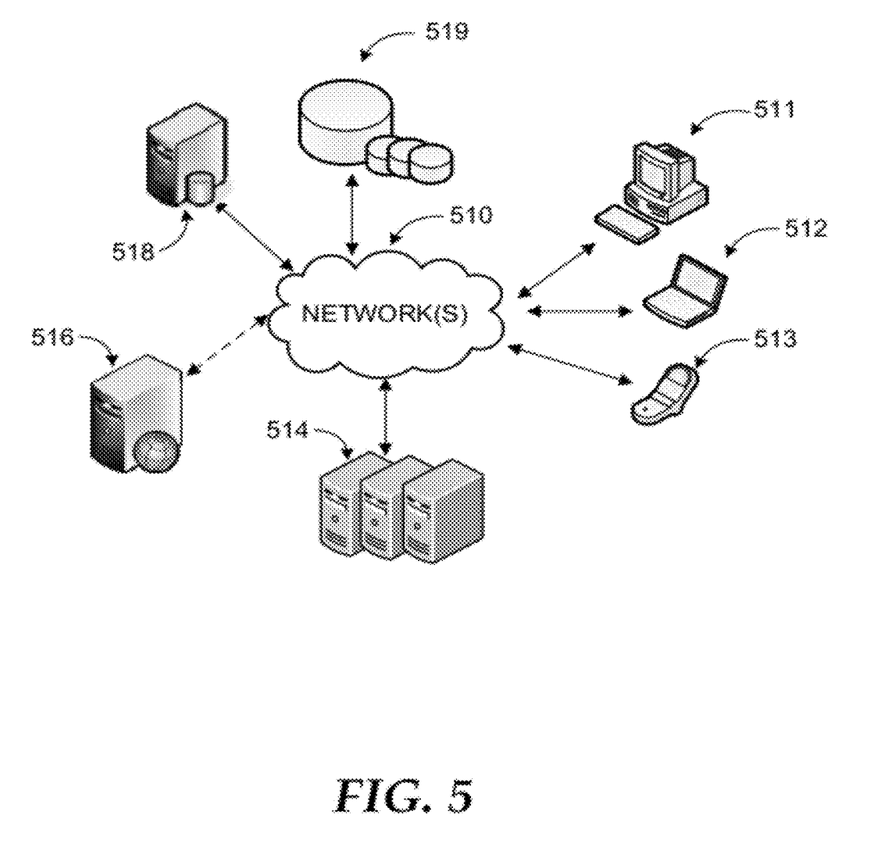
FIG. 5 is a networked environment, where a system according to embodiments may be implemented.

FIG. 5 is an example networked environment, where embodiments may be implemented. A position aware gesture recognition and visual feedback system may be implemented via software executed over one or more servers 514 such as a hosted service. The platform may communicate with client applications on individual computing devices such as a smart phone 513, a laptop computer 512, or desktop computer 511 (client devices') through network(s) 510.

Client applications executed on any of the client devices 511-513 may facilitate communications via application(s) executed by servers 514, or on individual server 516. An application executed on one of the servers may facilitate the detection and tracking of user gestures and the processing of images from a capturing device to perform gesture tracking and location analysis. The application may provide visual feedback to a user by correlating a user's gesture to a location on the display where the user interaction takes place. The application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing gesture detection/tracking and visual feedback to a user over an interactive user interface. Furthermore, the networked environments discussed in FIG. 5 are for illustration purposes only. Embodiments are not limited to the example applications, modules, or processes.

Figure 6:
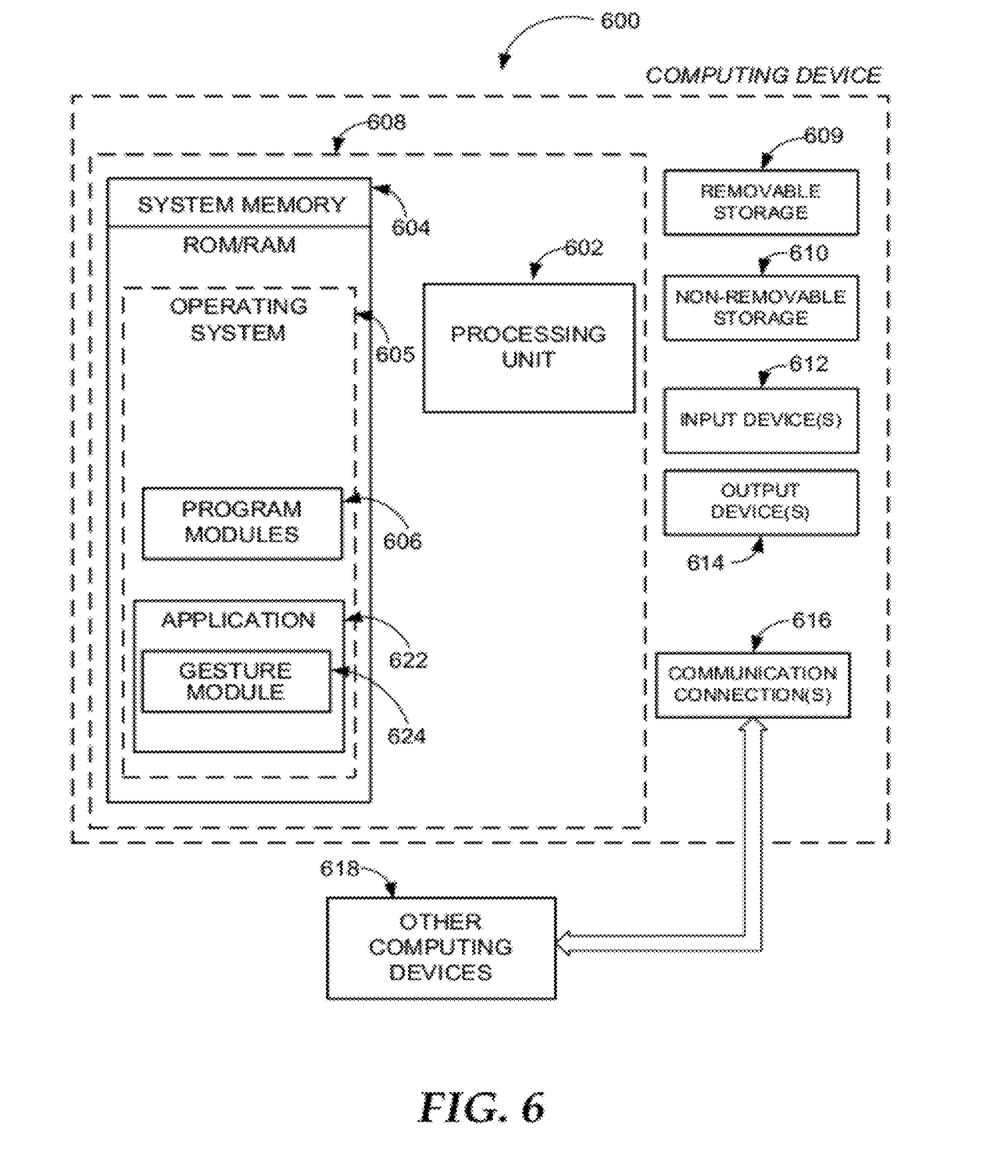
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application with a position aware gesture based input mechanism according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, application 622, and gesture module 624.

Application 622 may enable a computing device 600 to continually process images from a capture device in order to detect and track gestures by one or more users and to provide visual feedback to the user over the user interface. Through a user interface controlled by gesture module 624, application 622 may project an image of the user on a display such that gestures performed by a user can be correlated to a specific location on the display enabling a user to have real time visual feedback of user gestures. The application may simultaneously detect and track gestures provide visual feedback, while minimizing user interface interference. Application 622 and configuration module 624 may be separate application or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
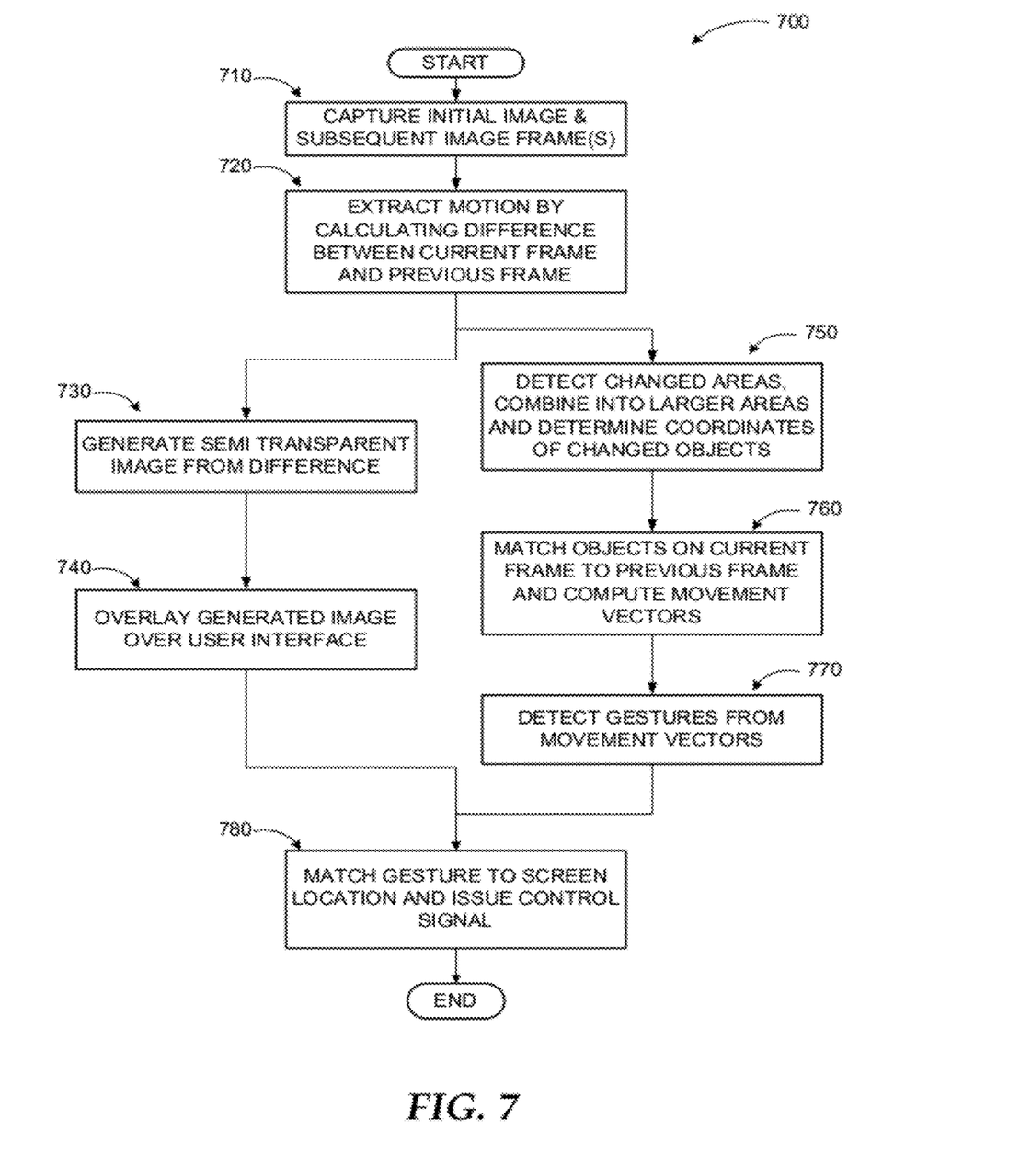
FIG. 7 illustrates a logic flow diagram for a process of detecting gestures and providing visual feedback as a user interface method according to embodiments.

FIG. 7 illustrates a logic flow diagram for process 700 of detecting gestures and providing visual feedback as a user interface method according to embodiments. Process 700 may be implemented on a computing device or similar electronic device capable of executing instructions through a processor.

Process 700 begins with operation 710, where a capturing device captures an initial image and subsequent image frames. In an embodiment, the capturing device may store the images to memory for transmission to a computing device. In another embodiment, the capturing device may continuously transmit the images to the computing device for storage and processing. At operation 720, the computing device analyzes the difference between a current frame and a previous frame to produce a binary output containing either changed or unchanged pixels on the frame, where changed pixels correspond to user motion.

At operation 730, a semitransparent image may be generated from the difference and overlaid over the user interface (i.e. display device) at subsequent operation 740. On another branch of the process, the image frame may be divided into larger tiles containing a large number of pixels at operation 750 upon detection of the changed pixels. This allows the location of changed areas to be determined by counting the changed pixels within a specific tile. Neighboring tiles, which also contain changed pixels, may be combined together to produce a selection of changed objects, and the location of the changed objects may be determined corresponding to the capturing device's coordinate system using the size, position, and shape of the objects within the predefined coordinate system.

At operation 760, the changed objects may be matched to corresponding objects detected on the previous image frames, and their coordinate locations are determined based on size, position, shape, and location proximity. Movement vectors are calculated in the form of sets of coordinates changing in time, where the coordinates may indicate the objects size, position and shape within the capturing device's coordinate system. At operation 770, user gestures are detected by analysis of movement vectors. According to some embodiments, the user gestures may be detected by comparing movement vectors with preset patterns, and the gesture location is then computed relative to the preset movement vectors within the camera's coordinates. At operation 780 following operations 740 and 770, the user gesture may be matched to the display location and an action may be initiated by a user for control of the computing device.

The operations included in process 700 are steps in a continuous loop of gesture tracking and visual feedback. Process 700 occurs continuously and simultaneously to consistently track a user's gesture in real time, to match a user's gesture location with capturing device coordinates and display coordinates, and to provide real time visual feedback to the user of the user's gestures over the user interface.

The operations included in process 700 are for illustration purposes. Gesture tracking and visual feedback may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for providing input to a computer system comprising:
   capturing one or more images of a user creating an input gesture;
   processing the captured one or more images to track the input gesture;
   determining a relative location of the input gesture on a user interface by matching coordinates of the one or more images with coordinates of the user interface;
   generating a binary image of the one or more images, wherein the binary image calculates a difference between frames resulting in a binary output of changed and unchanged pixels such that changed pixels indicate a user motion;
   providing real-time visual feedback of the input gesture over the user interface by overlaying the binary image on the user interface such that only the changed pixels indicating the motion of the user are visible and motionless portions of the binary image are invisible;
   suppressing the real-time visual feedback until a predefined gesture is performed to avoid interference;
   adjusting the binary image to match a display such that the binary image is scaled larger than a screen to allow for the input gesture on edges; and
   enabling the user to control an application through the input gesture.

2. The method of claim 1, wherein the input gesture includes at least one from a set of: a motion of a body part, a positioning of a body part, a motion of an entire body, a positioning of an entire body, and eye tracking.

3. The method of claim 1, wherein the real-time visual feedback includes displaying of at least one of a scaled version and a transformed version of the captured one or more images of the user near an element of the user interface focused on by the user.

4. The method of claim 3, wherein the captured one or more images of the user is displayed in one of a transparent and semitransparent manner such that the interference with the user interface is reduced.

5. The method of claim 1, further comprising:
   capturing the one or more images of the input gesture performed by a plurality of body parts; and
   providing visual feedback of the input gesture over the user interface such that the user is enabled to control a plurality of aspects of the application through the input gesture.

6. The method of claim 1, further comprising:
   capturing the one or more images of the input gesture performed by a plurality of users; and
   providing visual feedback of the input gesture over the user interface such that the plurality of users are enabled to control a plurality of aspects of the application through the input gesture.

7. The method of claim 6, wherein the plurality of users are enabled to distinguish their respective gestures based on the one or more images on the user interface.

8. The method of claim 1, wherein the input gesture further includes one of a sign language gesture and a gesture representing a standardized textual character.

9. The method of claim 1, wherein the application is controlled by one of: an input module integrated to the application, an input module integrated to an operating system of the computer system, and an input control application executed by the computer system.

10. An electronic device capable of accepting position aware gesture based input, the electronic device comprising:
    a functional component;
    an image capture component;
    a display; and
    a control component executing a gesture module integrated with an application operated on the electronic device, the control component configured to:
    capture images of users creating input gestures;
    process the captured images to track the input gestures;
    store the captured images in a memory;
    divide image frames into tiles of a predefined size;
    compute a difference between a current frame and a previous frame by counting changed pixels within a selected tile, wherein the changed pixels correspond to a motion of each of the users;
    determine a location of changed areas on the captured images based on the difference and by combining changes in neighboring: tiles together to produce a list of changed objects, wherein the changed objects include at least one of: a size, a shape, and a position of objects in the change areas, representing the motion of each of the users;
    determine trajectories of the objects as a set of movement vectors calculated from a set of coordinates changing in time, wherein the set of coordinates indicate the size, the shape, and the position of the changed objects within as coordinate system of the image capture component;
    determine the input Restores based on a comparison of the trajectories of the objects with preset patterns and the location of the input gestures as captured by the image capture component relative to preset movement vectors within the coordinate system of the image capture component;

determine a relative location of each of the input gestures on the display by matching coordinates of the image capturing component with coordinates of the display;

generate a binary image of the captured images, wherein the binary image calculates a difference between frames resulting in a binary output of changed and unchanged pixels such that changed pixels indicate the motion of each of the users;

provide real-time visual feedback of the input gestures over the display by overlaying the binary image on a user interface of the display such that only the changed pixels indicating the motion of each of the users are visible and motionless portions of the binary image are invisible;

suppress the real-time visual feedback until predefined gesture is performed to avoid interference;

adjust the binary image to match the user interface such that the binary image is scaled larger than a screen to allow for the input gestures on edges; and employ the input gestures to enable the users to control an aspect of the functional component.

11. The electronic device of claim 10, wherein the control component is further configured to:
convert a semi-transparent image from the binary image;
scale the semi-transparent image; and
overlay the semi-transparent image onto the user interface depicted on the display to provide the real-time visual feedback of the input gestures over the user interface.

12. The electronic device of claim 11, wherein the control component is further configured to:
transform the binary image into the semi-transparent image to match the user interface; and
match coordinates of the captured images with coordinates of the user interface depicted on the display such that the real-time visual feedback indicates to the users which element of the user interface is being controlled by the input gestures.

13. The electronic device of claim 10, wherein the object trajectories are computed in sets of coordinates changing in time.

14. The electronic device of claim 11, wherein the control component is further configured to:
match objects in the current frame to objects detected on previous frames based on a site and a proximity to the location.

15. The electronic device of claim 10, wherein the control component is configured to determine the location of changed areas on the captured images by dividing the captured images into tiles of predefined sizes and counting the changed pixels within each tile.

16. The electronic device of claim 10, wherein the device includes one of a computing device, a television set, an entertainment center, an interactive message hoard, an advertisement stand, and an automated teller machine.

17. A method to be executed on a computing device, the method comprising:
receiving a continuous stream of images from an image capturing device, wherein the images include users creating input gestures;
processing the images to track the input gestures;
correlating a relative location of the input gestures to a corresponding location on a user interface display by matching coordinates of the image capturing device with coordinates of the user interface display;
generating, a binary image of the images, wherein the binary image calculates a difference between frames resulting in a binary output of changed and unchanged pixels such that changed pixels indicate a motion of each of the users;
providing real-time visual feedback of the input gestures over the user interface by overlaying the binary image on the user interface such that only the changed pixels indicating the motion of the users are visible and motionless portions of the binary image are invisible;
interpreting the input gestures as input signals to enable the users to operate aspects of an application executed on the computing device, wherein the input signals include one or more actions to position and move elements on the display, scroll through pages, and select objects on the display;
suppressing the real-time visual feedback until a predefined gesture is performed and again after the predefined gesture is completed to avoid interference; and
adjusting the binary image to match a display such that the binary image is scaled larger than a screen to allow for the input gestures on edges.

18. The method of claim 17, wherein the input gestures are detected by computing, a difference between frames in the continuous stream of images and analyzing a number of changed pixels in predefined sets of tiles in the frames.

19. The method of claim 7, wherein the representative image is one of a representation of the users and a representation of a body part performing the input gestures, and wherein the location on the user interface is determined by matching a capturing device's location coordinate system to the user interface display coordinate system.

20. The method of claim 17, wherein the input gestures includes at least one from a set of a motion of a body part, a positioning of a body part, a motion of an entire body, a positioning of an entire body representing at least one from a set of: a selection of a user interface option, a sign language gesture, and a standardized textual character.

* * * * *